United States Patent [19]
Suski

[11] Patent Number: 5,606,303
[45] Date of Patent: Feb. 25, 1997

[54] FLEXIBLE PRINTED CIRCUIT SLEEP SWITCH FOR ELECTRONIC DEVICE

[75] Inventor: Edward D. Suski, Lake Forest, Calif.

[73] Assignee: AST Research, Inc., Irvine, Calif.

[21] Appl. No.: 430,475

[22] Filed: Apr. 28, 1995

[51] Int. Cl.$^6$ .................................................. G01B 7/16
[52] U.S. Cl. ...................... 338/210; 338/211; 338/212; 338/196; 338/198; 338/2; 338/6
[58] Field of Search ............................. 338/2, 6, 92, 99, 338/114, 150, 154, 196, 198, 210–212

[56] References Cited

U.S. PATENT DOCUMENTS

| | | | |
|---|---|---|---|
| 2,458,354 | 1/1949 | De Forest | 338/2 |
| 3,278,881 | 10/1966 | Anderson et al. | 338/114 |
| 4,143,367 | 3/1979 | Schestag | 338/110 |
| 5,077,551 | 12/1991 | Saitou | 340/700 |
| 5,086,785 | 2/1992 | Gentile et al. | 338/2 |
| 5,280,265 | 1/1994 | Kramer et al. | 338/210 |
| 5,309,135 | 5/1994 | Langford | 338/211 |

*Primary Examiner*—Tu B. Hoang
*Assistant Examiner*—Karl Easthom
*Attorney, Agent, or Firm*—Knobbe, Martens, Olson & Bear, L.L.P.

[57] ABSTRACT

A notebook computer or other electronic device has a flexible cable interconnecting electronic circuitry in a base with electronic circuitry in a cover. A flexible potentiometer is coupled to said flexible cable in a location which bends when said cover is opened and closed with respect to the base. The resistance of the flexible potentiometer has a first value when the cover is closed and has a second value when the cover is open. A detection circuit is responsive to the resistance of the flexible potentiometer and generates an output signal which indicates whether the cover is open or closed.

9 Claims, 4 Drawing Sheets

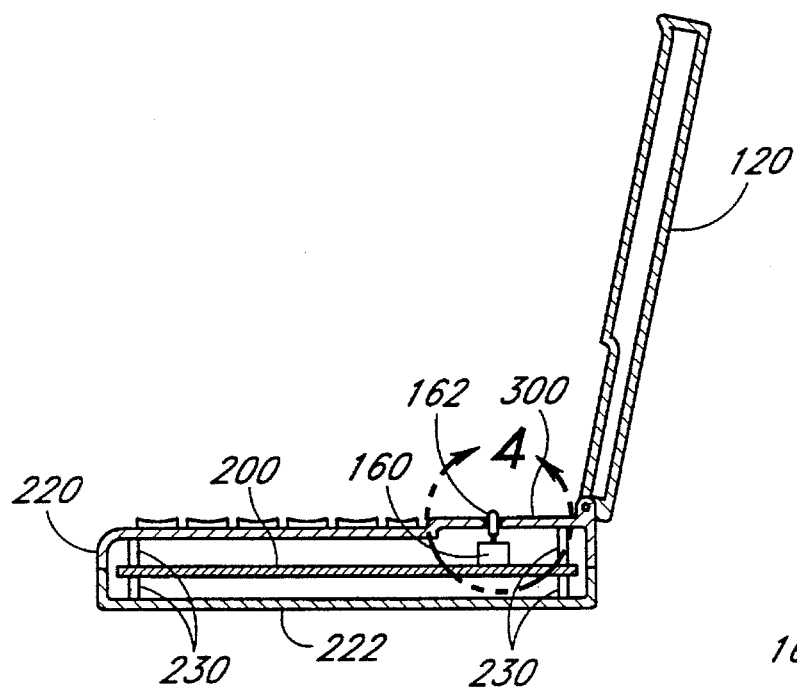
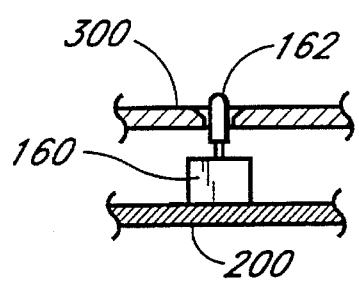
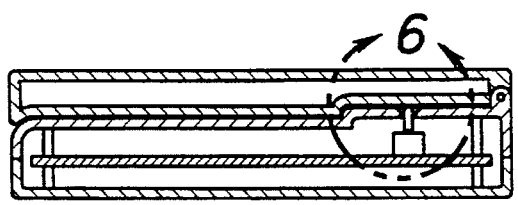
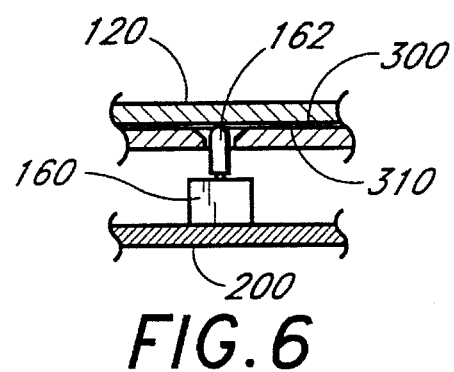

FLEXIBLE PRINTED CIRCUIT SLEEP SWITCH FOR ELECTRONIC DEVICE

BACKGROUND OF THE INVENTION

1. Field of the Invention

The present invention is in the field of portable electronic equipment, and, in particular, is in the field of portable computers having hinged enclosures wherein, when the cover of a hinged enclosure of such a portable computer is closed, a switch is activated to enable the portable computer to enter a suspended mode (or sleep mode) of operation to reduce the power consumption of the portable computer.

2. Description of the Related Art

Portable electronic equipment, such as portable computers (e.g., laptop computers, notebook computers, palm computers, and the like), are powered by batteries when operated away from a convenient AC power source. Because the operating capacities of batteries are limited, much effort has been expended to reduce the power required by the portable computers. In particular, such portable computers typically include a microprocessor, one or more disk drives, a display, such as a liquid crystal display (LCD), and numerous supporting components, each of which requires power from one or more batteries when the portable computer is operational.

One feature which has been added to certain portable computers is a so-called "suspend switch." Basically, a portable computer has a base portion which supports a keyboard. The base portion is hinged to a cover portion which usually includes the video display (e.g., an LCD). When the cover portion is closed with the portable computer in operation, it is assumed that, because the user is no longer able to observe the display or use the keyboard, it is likely that the user is not going to be actively using the portable computer for awhile, but, on the other hand, the user does not want to turn the portable computer off in order to avoid losing any data that may be resident in the memory of the portable computer. Furthermore, a considerable amount of time is required to gracefully exit some programs and shut the portable computer down, followed by considerably more time to re-boot the computer when the user wants to resume the interrupted task. Thus, instead of requiring the user to shut the portable computer down completely in order to conserve the energy stored in the battery, many portable computers provide a "suspend mode" (or "sleep mode") of operation wherein the power to many energy consuming components, such as the LCD, is turned off. Power continues to be provided to the memory and other selected components necessary to enable the portable computer to successfully resume operation when power is fully restored.

In some portable computers, the suspend mode is activated by a user-activated switch or by a combination of keyboard keys prior to closing the cover. On other portable computers, the suspend mode is automatically activated by a suspend switch which is caused to close (or open) when the cover of the portable computer is closed. This eliminates the need for the user to remember to activate the suspend mode prior to closing the cover of the portable computer.

The automatic suspend switch has proven to be very useful in extending the operating time of a portable computer between battery recharging; however, it has been found that the mechanical operation of the suspend switch does not readily lend itself to economical implementation on portable computers. In particular, in order to facilitate the automation of the manufacturing of portable computers, it is desirable that the suspend switch be mounted directly onto a printed circuit board within the portable computer. However, the bases and covers of many portable computers are constructed from molded plastic parts which tend to have a fairly wide range of dimensional tolerances with respect to the fitting of parts with respect to each other. Thus, it has been found to be difficult to find a simple and economical printed circuit board mounted mechanical switch that will consistently operate within the range of tolerances of the plastic parts. In particular, commercially available switches do not have a sufficiently wide range of pre-travel (movement of the switch actuator before the switch contacts engage) and overtravel (permissible movement of the actuator after the switch contacts engage) to accommodate the typical range of positions of the printed circuit board with respect to the top of the base of the portable computer. Thus, some portable computers may be constructed with the pre-travel too large such that the switch does not activate when the cover is fully closed, while other portable computers constructed within the same tolerance limits may not have sufficient overtravel such that cover cannot be completely closed or such that the switch or printed circuit board is stressed when the cover is closed.

Thus, it can be seen that a need exists for a printed circuit board mounted switch which can be used in a portable computer or other portable electronic device to accurately detect when a cover or other moveable part is moved to an activating position. In particular, a need exists for a suspend or sleep switch which operates reliably, is inexpensive and is easy to install.

SUMMARY OF THE INVENTION

One aspect of the present invention is a detector which detects the position of a cover of an electronic device having a flexible cable interconnecting the cover with a base of the electronic device. The detector comprises a flexible potentiometer coupled to the flexible cable in a location where the flexible cable bends when the cover is moved with respect to the base portion. The flexible potentiometer has a resistance which varies in accordance with the degree of bend of the flexible cable. A detection circuit is coupled to the flexible potentiometer. The detection circuit is responsive to the resistance of the potentiometer to generate an output signal which indicates the position of the cover. Preferably, the detection circuit generates a first voltage level on the output signal when the cover is closed with respect to the base portion and generates a second voltage level on the output signal when the cover is open with respect to the base. Also preferably, the flexible potentiometer comprises a conductor comprising resistive ink. The conductor has a length which changes when the degree of bend of the flexible cable changes. The resistive ink has a resistance which varies in response to changes in the length.

Another aspect of the present invention is a system for indicating the relative position of first and second electronic parts connected by a flexible cable. The system comprises a flexible potentiometer coupled to the flexible cable. The flexible cable has a first radius of curvature when the first and second electronic parts have a first relative position. The flexible potentiometer has a second radius of curvature when the first and second electronic parts have a second relative position. The flexible potentiometer has a first resistance corresponding to the first radius of curvature and has a second resistance corresponding to the second radius of curvature. A circuit is coupled to the flexible potentiometer and is responsive to the first and second resistances of the flexible potentiometer. The circuit provides an output signal which indicates the first relative position when the flexible potentiometer has the first resistance and which indicates the second relative position when the flexible potentiometer has the second resistance. Preferably, the first resistance is greater than the second resistance when the first radius of curvature is smaller than the second radius of curvature.

Another aspect of the present invention is a method for determining the position of a cover with respect to a base. The method comprises the step of bending a flexible potentiometer between the cover and the base. The flexible potentiometer has a first resistance when the cover is closed and has a second resistance when the cover is open. The method includes the further step of detecting whether the flexible potentiometer has the first and second resistances. The method outputs an indication that the cover is closed when the first resistance is detected, and outputs an indication that the cover is opened when the second resistance is detected. Preferably, the flexible potentiometer is coupled to a flexible cable between the base and the cover.

Another aspect of the present invention is a suspend switch for a notebook computer having a base portion and a cover portion. The cover portion is electrically connected to the base portion via a flexible cable which bends so that the cover portion can be moved with respect to the base portion. The notebook computer includes suspend circuitry responsive to an input signal to cause the notebook computer to enter a suspended mode of operation. The suspend switch comprises a flexible potentiometer integral to the flexible cable to bend when the flexible cable bends as the cover portion is moved closer to the base portion. The flexible potentiometer has a resistance which varies with the degree of bend of the flexible potentiometer. A detection circuit is coupled to the flexible potentiometer. The detection circuit detects the resistance of the flexible potentiometer and provides the input signal to the suspend circuitry when the resistance has a predetermined magnitude corresponding to a position of the cover portion with respect to the base portion.

A further aspect of the present invention is a switch for detecting first and second positions of a first apparatus with respect to a second apparatus. The switch comprises a flexible potentiometer extending between the first apparatus and the second apparatus. The flexible potentiometer has a first degree of bend when the first apparatus is at the first position with respect to the second apparatus and has a second degree of bend when the first apparatus is at the second position with respect to the second apparatus. The flexible potentiometer has a first resistance when the flexible potentiometer has the first degree of bend and has a second resistance when the flexible potentiometer has the second degree of bend. A circuit is electrically coupled to the flexible potentiometer. The circuit is responsive to the first and second resistances to generate an output signal having a first value when the first apparatus is at the first position with respect to the second apparatus and having a second value when the first apparatus is at the second position with respect to the second apparatus.

An additional aspect of the present invention is a system for measuring the movement of a hinged display screen with respect to a base unit of a portable computer wherein the hinged display screen is electrically coupled to the base unit by a flexible cable. The system comprises resistive ink screened onto the flexible cable at a location on the flexible cable where the flexible cable bends when the hinged display screen is moved. The flexible cable has a degree of bending which varies in response to the movement of the hinged display screen. The resistive ink has a resistance which varies in response to the degree of bending of the flexible cable. A circuit is coupled to the resistive ink. The circuit generates an output signal responsive to changes in the resistance. The output signal thereby changes in response to changes in the degree of bending caused by the movement of the hinged display screen.

BRIEF DESCRIPTION OF THE DRAWINGS

The present invention will be described below in connection with the accompanying drawing figures in which:

FIG. 3 illustrates a cross-sectional view of a notebook computer having a conventional suspend switch mounted on a printed circuit board therein, and showing the cover in an open position;

FIG. 4 illustrates an enlarged cross-sectional view of the suspend switch of FIG. 3 showing the relationship of the top of the actuator with respect to the surface of the base portion of the notebook computer in more detail;

FIG. 5 illustrates the cross-sectional view of FIG. 3 with the cover of the notebook computer closed against the base portion and showing the effect upon the actuator of the suspend switch;

FIG. 6 illustrates an enlarged cross-sectional view of the suspend switch of FIG. 5 showing the relationship of the top of the actuator with respect to the surface of the base portion of the notebook computer in more detail;

DETAILED DESCRIPTION OF THE PREFERRED EMBODIMENT

Figure 1:
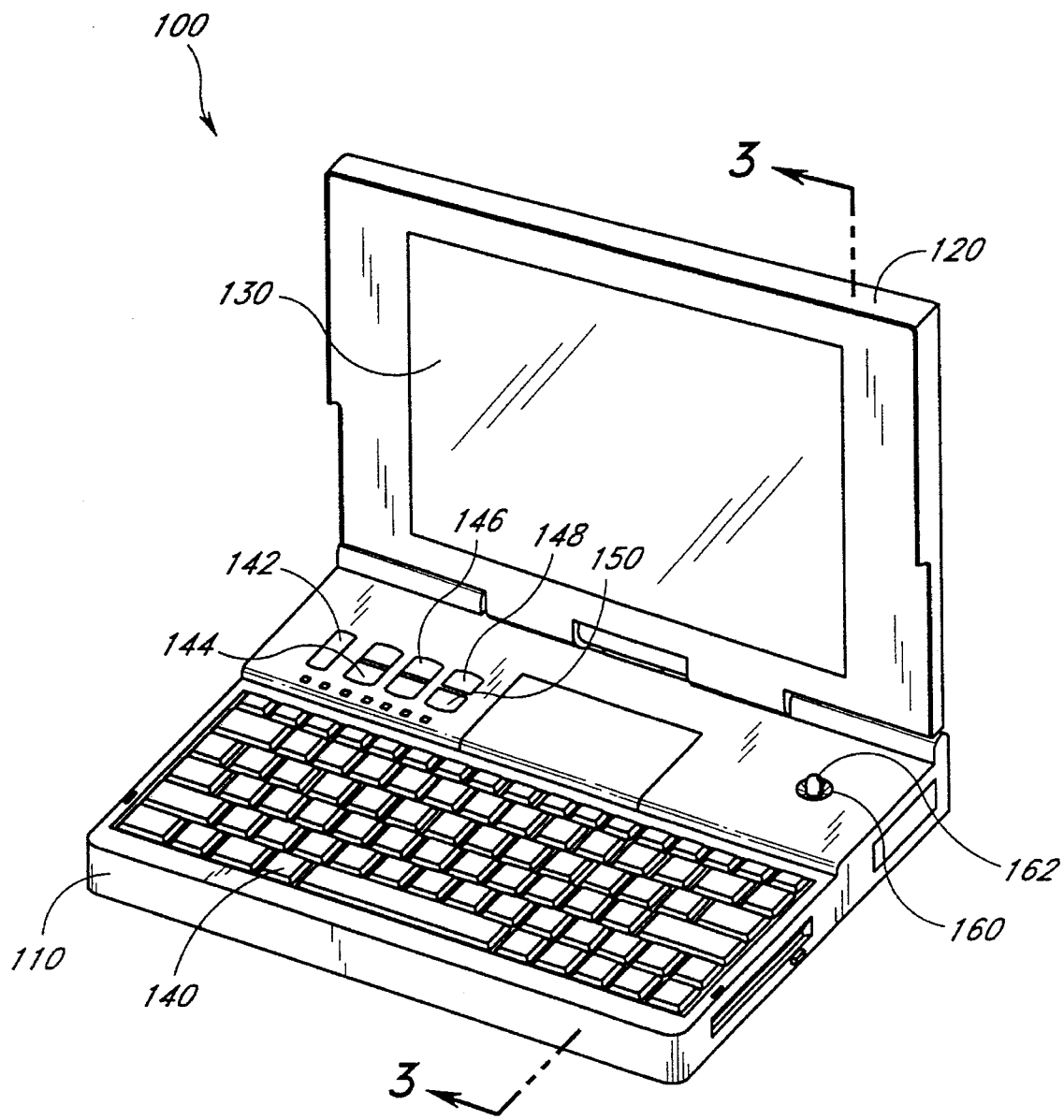
FIG. 1 illustrates a perspective view of a notebook computer into which the suspend switch of the present invention may be incorporated.

FIG. 1 illustrates an exemplary notebook computer 100 into which the present invention may advantageously be incorporated. As illustrated, the notebook 100 comprises a base portion 110 and a cover portion 120. The cover portion 120 typically supports a display screen 130 which may be a liquid crystal display (LCD) or other suitable display which can be operated for a reasonable time duration using batteries. In many cases, the display screen 130 is back lighted by a light source (not shown).

The base portion 110 supports a keyboard 140, an on-off switch 142, and a plurality of display adjustment switches, including a brightness switch 144, a contrast switch 146 and a display on-off switch 148. The functions of such switches are well-known to those skilled in the art and will not be discussed herein.

The base portion 110 may also support a manual suspend switch 150. The suspend switch 150 may be activated by a user to cause the notebook computer 100 to enter into a low-power mode of operation wherein the current state of the computer is maintained, but no further operations occur other than operations required to maintain the current state of timers and the like. In particular, the display screen 130 and its back lighting source (if any) are turned off, and an internal processor (not shown) is caused to operate at a lower frequency or to cease operations altogether. When the suspend switch 150 is again manipulated, the notebook computer 100 is restored to operation by turning the display screen 130 and its light source (if any) back on and returning the internal processor to its normal frequency of operation. Because the power to the notebook computer 100 was not turned off completely, the state of internal registers (not shown) and the data in memory (not shown) were not changed, and the notebook computer 100 can thus resume operation as if it had been running continuously. The circuitry and techniques required to implement the suspend mode of operation in a notebook computer or other such electronic device are well-known to those skilled in the art and will not be described in detail herein. Thus, the computer system is represented herein as a global block 156 in FIG. 2.

Figure 2:
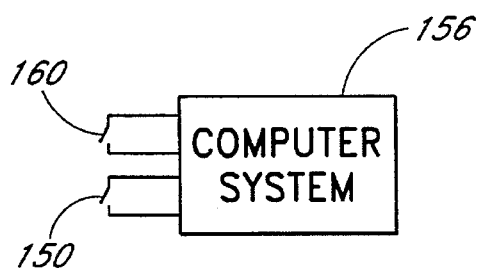
FIG. 2 illustrates a highly simplified block diagram of a computer system having a manually activated suspend switch and a cover activated suspend switch may be incorporated.

Many notebook computers, such as the notebook computer 100, have an alternative suspend switch that does not require manual manipulation. In particular, the notebook computer 100 includes a cover activated suspend switch 160 which is mounted on the top surface of the base portion 110 as shown in FIG. 1 and is electrically connected to the computer system 156 as shown in FIG. 2. The suspend switch 160 has an actuator 162 which is engaged and moved to actuate the switch 160 when the cover portion 120 is moved into engaging relationship with the base portion 110. The activation of the suspend switch 160 causes the notebook computer 100 to go into the suspend mode of operation as before, but with the usual difference that when the cover is opened and the suspend switch 160 is no longer activated, the notebook computer 100 will automatically exit from the suspend mode of operation and resume normal operation.

Cover activated suspend switches, such as the suspend switch 160, are advantageous because they do not require the user of the notebook computer 100 to remember to manually activate the suspend switch 150 when the user wants to temporarily quit using the notebook computer 100. In particular, the user only has to close the cover portion 120 against the base portion 110, and the notebook computer 100 automatically enters the suspend mode of operation. Thus, there is no possibility of the notebook computer 100 remaining at full power operation with the display screen 130 operational with the cover closed-that is, assuming that the suspend switch 160 operates properly.

It has been found, however, that conventional cover activated suspend switches 160 are unreliable or are expensive to install. In particular, most conventional notebook computers 100 are manufactured using molded plastic parts for the base portion 110 and the cover portion 120. As illustrated in FIGS. 3 and 4, the base portion 110, for example, encloses a printed circuit board 200 on which the primary electronic components, such as the microprocessor, the memory, and other supporting circuits are mounted. The printed circuit board 200 is held in position with respect to an upper half 220 and a lower half 222 of the base portion 110 by a plurality of standoffs 230. The standoffs 230 may be commercially available standoffs, or, in exemplary notebook computers 100, may be molded into the plastic of the upper half 220 and lower half 222 of the base portion 110.

Although a conventional electrical switch could be mounted onto the base portion 110 and then wired to the printed circuit board 200, such a construction technique does not readily lend itself to automated manufacturing of the notebook computer 100. Preferably, the suspend switch 160 should be mounted directly onto the printed circuit board 200, as illustrated in FIG. 3, during the circuit board manufacturing process, a process which can be highly automated. Then, when the printed circuit board 200 is mounted in the base portion 110, the suspend switch should be positioned to be actuated by the actuator 162 when the cover portion 120 is closed as illustrated in FIGS. 5 and 6. However, because of part tolerances, the actuator 162 of the switch 160 may not extend sufficiently above a top surface 210 of the base portion 110 to cause the contacts (not shown) of the switch 160 to actuate before the cover portion 120 is completely closed. Thus, although the user may think the notebook computer 100 has entered the suspend mode, all the circuitry will be operating at full power and rapidly consuming the energy stored in the internal batteries (not shown) of the notebook computer 100.

On the other hand, if the actuator 162 extends too far above the top surface 210 of the base portion 110, the contacts (not shown) in the switch 160 may close well before the cover portion 120 is completely closed. In particular, the actuator 162 may be moved through its entire length of travel and then stop such that the cover portion 120 cannot be completely closed or such that considerable stress is imposed on the switch 162, the cover portion 120 and the printed circuit board 200. Such stress could eventually result in failure of one or more of the components.

Figure 7:
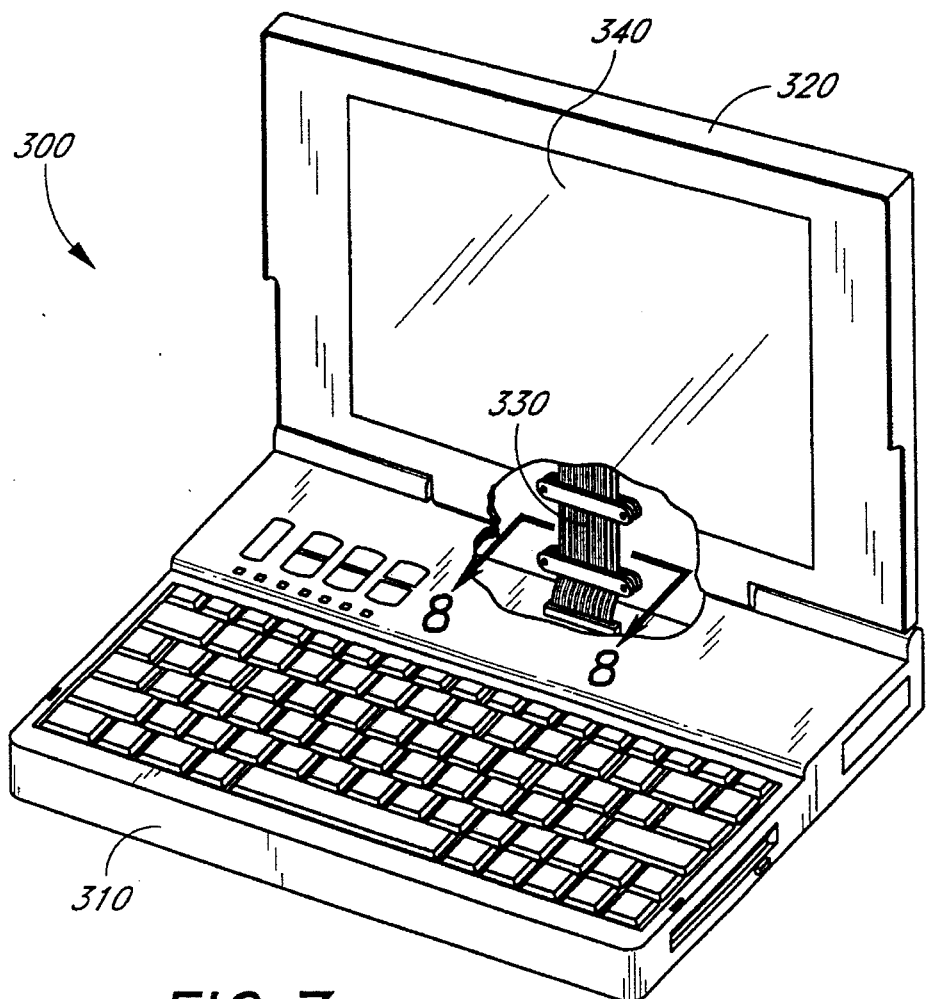
FIG. 7 illustrates a notebook computer having a flexible cable between the base portion and the cover portion onto which the present invention is incorporated.

FIGS. 7–11 illustrate a preferred embodiment of the present invention which provides a solution to the above-described problems with conventional suspend switches. In particular, as illustrated in FIG. 7, a notebook 300 includes a base portion 310 and a cover portion 320, as before; however, no mechanical suspend switch is provided to be actuated when the base portion 310 and the cover portion 320 are brought together when the notebook computer 300 is closed. Rather, the present invention incorporates a sensor formed into a flexible cable 330 which extends between the base portion 310 and the cover portion 320. In particular, the flexible cable 330 is similar to a conventional flexible cable which provides the electrical interconnections between the electronic circuitry mounted in the base portion 310 and the electronic circuitry, particularly an LCD 340, mounted in the cover portion 320. As well known in the art, the flexible cable bends as the cover portion 320 is moved with respect to the base portion 310 so that the electrical interconnections between the two portions are maintained without interfering with the movement of the cover portion 320 relative to the base portion 310.

Figure 8:
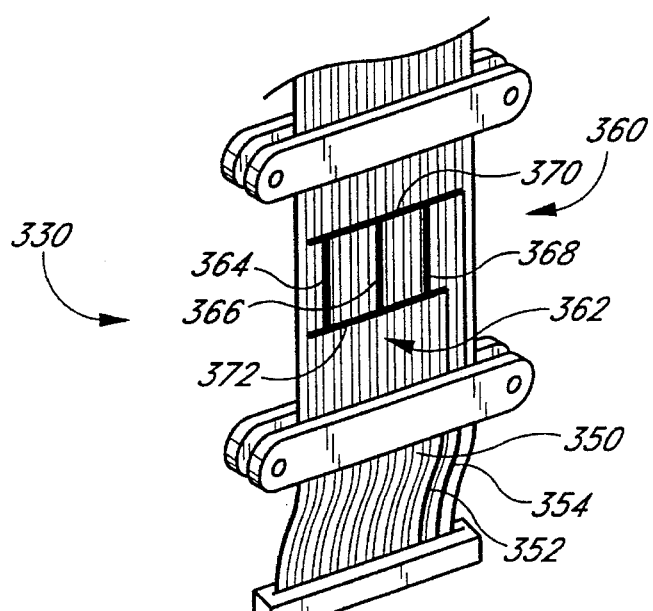
FIG. 8 illustrates an enlarged view from the rear of the flexible cable in FIG. 7 showing the placement of the flexible potentiometer.
Figure 9:
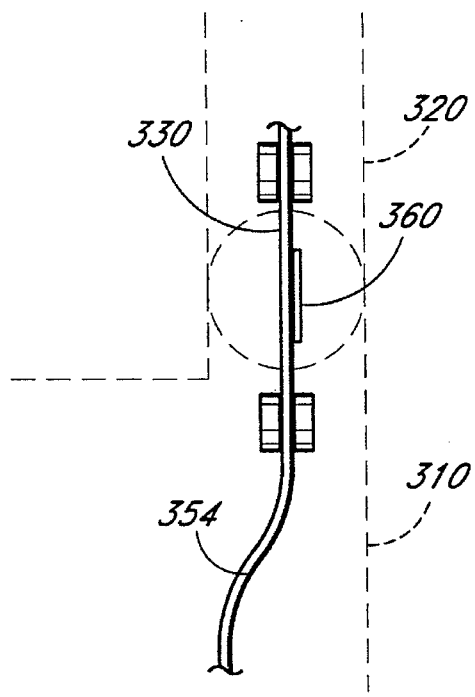
FIG. 9 illustrates a side elevational view of the flexible cable with the base portion and the cover portion in dashed lines showing the lack of curvature of the flexible potentiometer when the cover portion is open with respect to the base portion.
Figure 10:
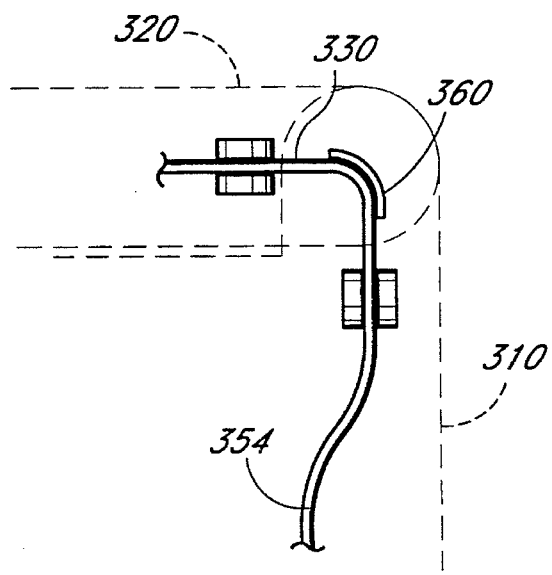
FIG. 10 illustrates a side elevational view of the flexible cable with the base portion and the cover portion in dashed lines showing the large degree of curvature of the flexible potentiometer when the cover portion is closed with respect to the base portion.

As illustrated in more detail in FIG. 8, the flexible cable 330 includes a plurality of conventional conductors 350 which communicate power and signals to the cover portion 320 from the base portion 310. In addition, the flexible cable 330 in accordance with the present invention includes an additional pair of signal lines 352, 354 having respective first ends which connect to electronic circuitry (described below in connection with FIG. 11) within the base portion 310. The signal lines 352, 354 have respective second ends which are connected to a flexible potentiometer 360 which is formed on a surface 362 of the flexible cable 330. In particular, the flexible potentiometer 360 is located in the most actively bending portion of the flexible cable 330. In other words, the flexible potentiometer 360 is located where the radius of an arc formed by the bending of the flexible cable 330 has the greatest variation between a maximum radius when the cover portion 320 is fully open, as illustrated in FIG. 9, and a minimum radius when the cover portion 320 is fully closed, as illustrated in FIG. 10. As used herein, the degree of bend will refer to the relative smallness of the radius of curvature of the flexible cable 330 in the region of the flexible potentiometer 360. In other words a large degree of bend corresponds to a small radius, as illustrated in FIG. 10, and a small degree of bend corresponds to a large radius. The flexible cable 330 has a zero degree of bend when the flexible cable 330 is substantially straight in the region of the flexible potentiometer 360, as illustrated in FIG. 9.

The flexible potentiometer 360 is preferably constructed in accordance with U.S. Pat. No. 5,157,372 or U.S. Pat. No. 5,309,135, both of which are incorporated by reference herein. Briefly, as described in the two referenced patents, the flexible potentiometer 360 comprises a substrate onto which a resistive ink is deposited in a pattern. Preferably, a segmented conductor, such as a metallic conductor, is positioned on top of the resistive ink. As explained in the two patents, when the substrate is flexed (i.e., deflected or bent), the resistance of the flexible potentiometer 360 varies by a measurable amount responsive to the degree or amount of the deflection. Such flexible potentiometers are commercially available from Flexpoint Inc. of Irvine, Calif.

For use with the present invention, the insulation on the surface 362 of the flexible cable 330 serves as the substrate onto which the resistive ink is deposited. Furthermore, it has been found to be unnecessary to include the segmented conductors described in the two patents. Thus, as further illustrated in FIG. 8, the flexible potentiometer 360 comprises three lengths 364, 366, 368 of resistive ink which are deposited on the flexible cable 330 by silk-screening or other know methods for accurately depositing ink onto other materials so that the three lengths 364, 366, 368 are integral to the flexible cable 330. The three lengths 364, 366, 368 are positioned in parallel with each other and in parallel with the conductors in the flexible cable 330. The three lengths 364, 366, 368 are electrically connected at respective first ends by a first length 370 of conductive ink (e.g., silver ink, or the like) and at respective second ends by a second length 372 of conductive ink such that the three lengths 364, 366, 368 are electrically in parallel with each other. The first and second lengths 370, 372 connect the first and second ends of the lengths 364, 366, 368 to the signal lines 352, 354 and thus to the detection circuit described below. Alternatively, vias or feed through holes (not shown) can be formed in the flexible cable 330 to connect the lengths 364, 366, 368 to electrical conductors within the flexible cable 330 such that the electrical conductors interconnect the lengths to the detection circuit.

In accordance with the preferred embodiment of the present invention, the flexible potentiometer 360 (i.e., the resistive ink lines) is mounted on the outside of the arc formed when the flexible cable 330 is bent as the cover portion 320 is closed. Thus, in accordance with the operation of the flexible potentiometer 360, as described in the two patents, the resistance of the :flexible potentiometer 360 increases significantly when the cover portion 320 is closed and decreases when the cover portion 320 is opened.

Figure 11:
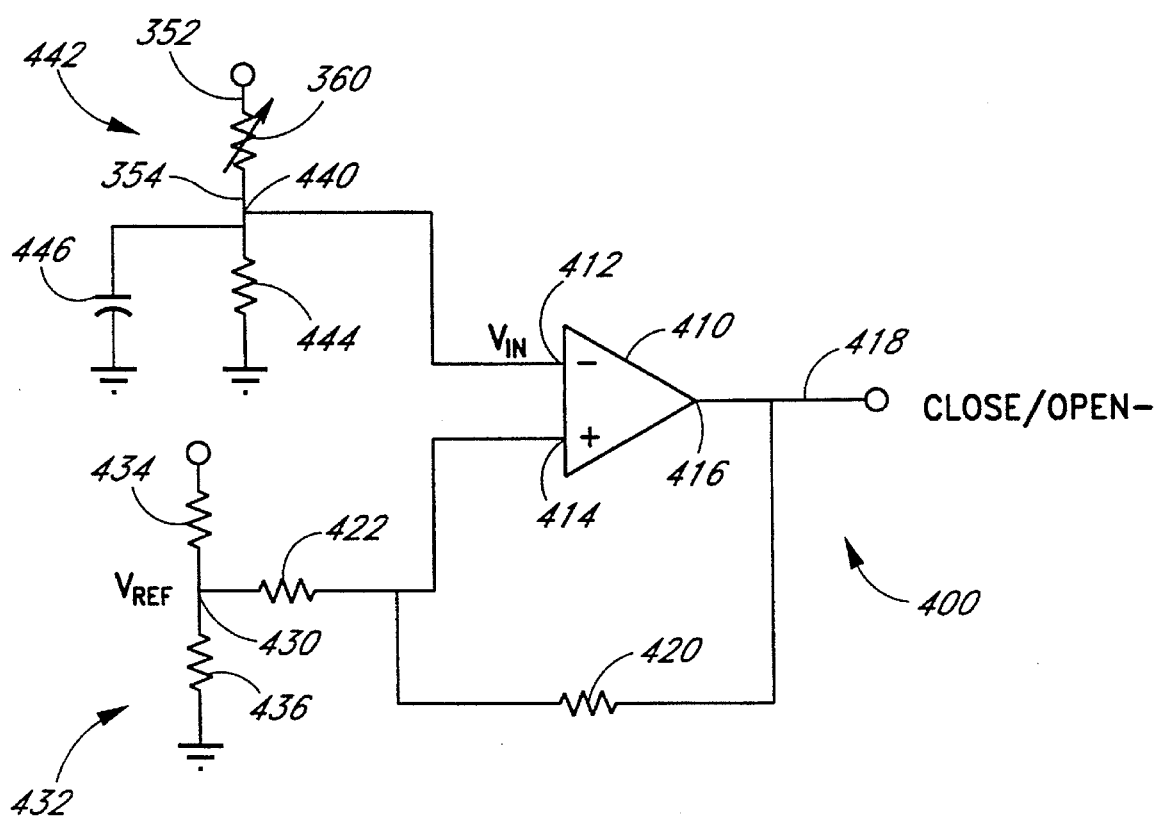
FIG. 11 is a schematic diagram of a circuit which detects the resistance of the flexible potentiometer and which provides an output signal which indicates whether the cover of the portable computer is open or closed.

The present invention incorporates the flexible potentiometer 360 into a detection circuit 400 illustrated in FIG. 11. As illustrated in FIG. 11, the detection circuit 400 comprises a comparator 410, which may advantageously be one-fourth of an LM324 quad operational amplifier available from National Semiconductor, or the like, connected as shown to operate as a voltage comparator having hysteresis. The amplifier 410 has an inverting (−) input 412, an non-inverting (+) input 414 and an output 416. Preferably, the output 416 drives a digital signal line 418. The signal line 418 is designated as an CLOSED/OPEN- signal line. The CLOSED/OPEN- signal line 418 is provided as the input to the computer system 156 of FIG. 2 in place of the electrical connection from the switch 160, also shown in FIG. 2. When the CLOSED/OPEN- signal on the signal line 418 has a logical high value (e.g., approximately +5 volts), the signal line 418 indicates that the cover portion 320 is closed, as shown in FIG. 10. On the other hand, when the signal line 418 has a logical low value (e.g., approximately zero volts or logical ground), the signal line 418 indicates that the cover portion 320 is open, as illustrated in FIG. 10.

The non-inverting (+) input 414 is connected via a resistor 420 to the output 416. The resistor 420 advantageously has a resistance of approximately 10,000,000 ohms and provides the hysteresis for the voltage comparator formed by the operational amplifier 410. A resistor 422 connects the non-inverting input 414 to a common node 430 of a first resistive bridge 432. The common node 430 provides a reference voltage $V_{REF}$. The first resistive bridge 432 comprises a first resistor 434 connected in series with a second resistor 436 between the supply voltage (e.g., +5 volts) and logic ground. The values of the resistances of the first resistor 434 and the second resistor 436 are selected to adjust the reference voltage $V_{REF}$ on the node 430 to a predetermined magnitude. For example, if the two resistors 434, 436 are selected to have resistance values of 50,000 ohms and 39,000 ohms, respectively, the reference voltage $V_{REF}$ will have a magnitude of approximately 44 percent of the supply voltage (e.g., approximately 2.19 volts when the supply voltage is 5 volts).

The inverting (−) input 412 is connected to a common node 440 of a second resistive bridge 442 comprising the flexible potentiometer 360 and a third resistor 444 connected in series between the supply voltage and logic ground. A capacitor 446 is connected across the third resistor 444 between the second common node 440 and logic ground. A voltage $V_{IN}$ on the second common node 440 is responsive to the resistance of the flexible potentiometer 360. In the preferred embodiment described herein, the flexible potentiometer 360 has a resistance which ranges from approximately 20,000 ohms when the flexible cable 330 is substantially straight in the region where the deflection occurs to approximately 60,000 ohms when the flexible cable 330 is fully bent with the cover fully closed. The value of the resistance of the third resistor 444 is selected to be approximately 39,000 ohms. Thus, when the cover portion 320 is at least partially closed and the flexible potentiometer 360 has a resistance of approximately 50,000 ohms, the voltage $V_{IN}$ at the second node 440 will be approximately equal to the voltage $V_{REF}$ on the first node 430. When the cover is further closed, the voltage $V_{IN}$ on the second node 440 will decrease to less than the reference voltage $V_{REF}$ on the first node 430.

Thus, because the voltage $V_{IN}$ at the inverting input 412 is lower than the voltage $V_{REF}$ on the non-inverting input 414, the voltage on the output 416 will be high to indicate via the signal line 418 that the cover portion 320 is closed. In contrast, when the cover portion 320 is opened, the resistance of the flexible potentiometer 360 decreases such that the voltage $V_{IN}$ on the second node 440 increases. When the voltage on the second node 440 increases to a magnitude greater than the magnitude of the voltage $V_{REF}$ on the first node 430, the voltage on the output 416 will be low to indicate that the cover portion 320 is open. The value of the resistance of the third resistor 444, or of either the first resistor 434 or the second resistor 436, can be changed to select the resistance of the flexible potentiometer 360 at which the output signal on the output 416 changes magnitude. This can be done to accommodate different resistances of the flexible potentiometer 360, different degrees of closure of the cover portion 320 before the suspend mode is enabled, or other variations in the components. For example, in some applications, it may be desirable to replace the fixed resistor 444 with a variable resistor (not shown) to adjust the degree of closure of the cover portion 320 where the transition between the open indication and the closed indication occurs.

In one particular alternative embodiment, the resistances of the first, second and third resistors 434, 436 and 444 are selected such that the voltage swing on the input voltage $V_{IN}$ from the second bridge 442 has a maximum range (i.e., maximum change from its minimum voltage to its maximum voltage). Increasing the voltage range has the desirable effect of increasing the voltage change for each degree of movement of the cover portion 320 thus increasing the rate at which the input voltage $V_{IN}$ passes through the switching threshold. This increases the predictability of the position of the cover portion 320 when the output signal on the line 418 changes. When the resistance range of the flexible potentiometer 360 is 20,000 ohms to 60,000 ohms, differential calculus can be used to determine that a resistance value for the third resistor 444 of 34,641 ohms provides the maximum voltage range for the input voltage $V_{IN}$. Because such accuracy is not needed and because 34,641 ohms is not a standard resistance value, in this alternative embodiment, the third resistor 444 is selected to have a resistance of approximately 36,000 ohms. Accordingly, the first resistor 434 is also selected to have a resistance of approximately 36,000 ohms, and the second resistor 436 is selected to have a resistance of approximately 50,000 ohms. In this embodiment, the reference voltage $V_{REF}$ will be approximately 2.093 volts. By selecting the resistance of the second resistor 436 to be approximately 50,000 ohms, the output signal will switch when the flexible potentiometer 360 has been bent to have a resistance of approximately 50,000 ohms (i.e., such that approximately three-fourths of maximum resistance change has occurred). If it is preferred that the output signal switch when the cover portion 320 is closer to the base portion 310, a larger resistance value can be selected for the first resistor 434. Alternatively, if it is preferred that the output signal switch when the cover portion farther from the base portion 310, a smaller resistance value can be selected for the first resistor 434.

The capacitor 446 operates to filter noise out of the voltage $V_{IN}$ caused by irregular changes in the resistance of the flexible potentiometer 360 as the flexible cable 330 is bent. The hysteresis provided by the feedback resistor 420 assures that once the output voltage on the signal line 418 switches as the flexible cable 330 is moved in a first direction (e.g., as the flexible cable 330 is bent or as it is straightened out), the output voltage will stay switched until the flexible cable 330 is moved a significant distance in the opposite direction. Thus, the output signal will not fluctuate multiple times while the flexible cable 330 is bent such that the flexible potentiometer 360 has a resistance of approximately 50,000 ohms.

It should be further understood that the magnitude of the resistance of the flexible potentiometer 360 varies continuously as the cover portion 320 is moved from its fully open position to its fully closed position. Thus, rather than providing a CLOSED/OPEN- signal as illustrated in FIG. 11, an alternative detection circuit can be constructed to provide a plurality of different output values which indicate the angle of the cover portion 320 with respect to the base portion 310. For example, the output of the second resistive bridge 442 can be provided as the input to an analog-to-digital converter (not shown) to provide a digital output value corresponding to the position of the cover portion 320 with respect to the base portion 310.

While preferred embodiments of this invention have been disclosed herein, those skilled in the art will appreciate that changes and modifications may be made therein without departing from the spirit and scope of the invention as defined in the appended claims.

What is claimed is:

1. A detector which detects the position of a cover of an electronic device with respect to a base of said electrode device, said detector comprising:

a flexible cable interconnecting said cover with said base, said flexible cable comprising a plurality of conductors which communicate signals between electronic circuits in said cover and electronic circuits in said base of said electronic device;

a flexible potentiometer mounted on said flexible cable in a location where said flexible cable bends when said cover is moved with respect to said base portion such that said flexible potentiometer bends when said flexible cable bends, said flexible potentiometer having a resistance which varies in accordance with the degree of bend of said flexible cable; and a detection circuit coupled to said flexible potentiometer, said detection circuit responsive to said resistance of said potentiometer to generate an output signal which indicates said position of said cover.

2. The detector as defined in claim 1, wherein said detection circuit generates a first voltage level on said output signal when said cover is closed with respect to said base portion and generates a second voltage level on said output signal when said cover is open with respect to said base.

3. The detector as defined in claim 1, wherein said flexible potentiometer comprises a conductor comprising resistive ink, said conductor having a length which changes when said degree of bend of said flexible cable changes, said resistive ink having a resistance which varies in response to changes in said length.

4. A system for indicating the relative position of a first electronic part with respect to a second electronic part, said system comprising:

a flexible cable connected between said first electronic part and said second electronic part, said flexible cable comprising a plurality of conductors which communicate electrical signals between said first and second electronic parts, said flexible cable bending when said first electronic part is moved with respect to said second electronic part;

a flexible potentiometer mounted on said flexible cable to bend when said flexible cable bends, said flexible potentiometer having a first radius of curvature when said first and second electronic parts have a first relative position, said flexible potentiometer having a second radius of curvature when said first and second electronic parts have a second relative position, said flexible potentiometer having a first resistance corresponding to said first radius of curvature and having a second resistance corresponding to said second radius of curvature; and a circuit coupled to said flexible potentiometer and responsive to said first and second resistances of said flexible potentiometer, said circuit providing an output signal which indicates said first relative position when said flexible potentiometer has said first resistance and which indicates said second relative position when said flexible potentiometer has said second resistance.

5. A system for measuring the movement of a hinged display screen with respect to a base unit of a portable computer wherein said hinged display screen is electrically coupled to said base unit by a flexible cable, said system comprising:

resistive ink screened onto said flexible cable at a location on said flexible cable where said flexible cable bends when said hinged display screen is moved, said flexible cable having a degree of bending which varies in response to said movement of said hinged display screen, said resistive ink having a resistance which varies in response to said degree of bending of said flexible cable; and a circuit coupled to said resistive ink, said circuit generating an output signal responsive to changes in said resistance, said output signal thereby changing in response to changes in said degree of bending caused by said movement of said hinged display screen.

6. A method for determining the position of a cover with respect to a base, said cover coupled to said base to move with respect to said base, said method comprising the steps of:

connecting a flexible cable between said base and said cover so that said flexible cable communicates electrical signals between said base said cover, said flexible cable flexing when said cover moves with respect to said base;

forming a flexible potentiometer on said flexible cable using a resistive ink having a resistance which varies with respect to a curvature of said resistive ink, said flexible potentiometer located on said flexible cable such that said flexible potentiometer flexes when said flexible cable flexes to thereby cause said resistance of said potentiometer to change;

bending said flexible cable and said flexible potentiometer between the cover and the base, said flexible potentiometer having a first resistance when said cover is closed and having a second resistance when said cover is open;

detecting whether said flexible potentiometer has said first and second resistances;

outputting an indication that said cover is closed when said first resistance is detected; and outputting an indication that said cover is opened when said second resistance is detected.

7. A suspend switch for a notebook computer having a base portion and a cover portion, said notebook computer including suspend circuitry responsive to an input signal to cause said notebook computer to enter a suspended mode of operation, said suspend switch comprising:

a flexible cable electrically connecting said cover portion to said base portion, said flexible cable comprising a plurality of electrical conductors which carry signals between said base portion and said cover portion, said flexible cable bending so that said cover portion is moveable with respect to said base portion;

a flexible potentiometer mounted on said flexible cable to bend when said flexible cable bends as said cover portion is moved closer to said base portion, said flexible potentiometer having a resistance which varies with the degree of bend of said flexible potentiometer; and a detection circuit coupled to said flexible potentiometer, said detection circuit detecting said resistance of said flexible potentiometer and providing said input signal to said suspend circuitry when said resistance has a predetermined magnitude corresponding to a position of said cover portion with respect to said base portion.

8. A switch for detecting first and second positions of a first apparatus with respect to a second apparatus, said switch comprising:

a flexible cable which interconnects said first apparatus and said second apparatus, said flexible cable comprising a plurality of signal lines which communicate electrical signals between said first apparatus and said second apparatus, said flexible cable bending when said first apparatus is moved with respect to said second apparatus;

a flexible potentiometer formed on said flexible cable at a location on said flexible cable selected so that said flexible potentiometer bends when said flexible cable bends, said flexible potentiometer having a first degree of bend when said first apparatus is at said first position with respect to said second apparatus, said flexible potentiometer having a second degree of bend when said first apparatus is at said second position with respect to said second apparatus, said flexible potentiometer having a first resistance when said flexible potentiometer has said first degree of bond, said flexible potentiometer having a second resistance when said flexible potentiometer has said second degree of bend; and a circuit electrically coupled to said flexible potentiometer, said circuit responsive to said first and second resistances to generate an output signal having a first value when said first apparatus is at said first position with respect to said second apparatus and having a second value when said first apparatus is at said second position with respect to said second apparatus.

9. A system for measuring the movement of a hinged display screen with respect to a base unit of a portable computer, said system comprising:

a flexible cable which electrically connects said display screen to said base unit, said flexible cable comprising a plurality of electrical conductors which communicate video signals from said base unit to said display screen, said flexible cable bending when said display screen is moved with respect to said base unit;

resistive ink screened onto said flexible cable at a location on said flexible cable where said flexible cable bends when said hinged display screen is moved, said flexible cable having a degree of bending which varies in response to said movement of said hinged display screen, said resistive ink having a resistance which varies in response to said degree of bending of said flexible cable; and a circuit coupled to said resistive ink, said circuit generating an output signal responsive to changes in said resistance, said output signal thereby changing in response to changes in said degree of bending caused by said movement of said hinged display screen.

* * * * *

UNITED STATES PATENT AND TRADEMARK OFFICE
CERTIFICATE OF CORRECTION

PATENT NO. : 5,606,303
DATED : February 25, 1997
INVENTOR(S) : Edward D. Suski

Page 1 of 1

It is certified that error appears in the above-identified patent and that said Letters Patent is hereby corrected as shown below:

Replace independent Claim 5 with the following dependent Claim 5:

--   5. The system as defined in Claim 4, wherein said first resistance is greater than said second resistance when said first radius of curvature is smaller than said second radius of curvature. --

Signed and Sealed this

Twenty-fifth Day of December, 2001

Attest:

Attesting Officer

JAMES E. ROGAN
*Director of the United States Patent and Trademark Office*